(12) United States Patent
Yamazaki

(10) Patent No.: US 8,213,059 B2
(45) Date of Patent: Jul. 3, 2012

(54) ORIGINAL READER

(75) Inventor: Yoshitaka Yamazaki, Abiko (JP)

(73) Assignee: Canon Kabushiki Kaisha (JP)

( * ) Notice: Subject to any disclaimer, the term of this patent is extended or adjusted under 35 U.S.C. 154(b) by 588 days.

(21) Appl. No.: 12/269,117

(22) Filed: Nov. 12, 2008

(65) Prior Publication Data

US 2009/0122363 A1   May 14, 2009

(30) Foreign Application Priority Data

Nov. 12, 2007   (JP) ................................. 2007-293244

(51) Int. Cl.
    *H04N 1/04* (2006.01)
(52) U.S. Cl. ........................................ 358/474; 358/475
(58) Field of Classification Search .................. 358/475, 358/406, 296, 474; 250/234
    See application file for complete search history.

(56) References Cited

U.S. PATENT DOCUMENTS

| | | | | |
|---|---|---|---|---|
| 4,706,130 A | * | 11/1987 | Yamakawa | 358/296 |
| 6,376,837 B1 | * | 4/2002 | Itabashi et al. | 250/234 |
| 7,477,429 B2 | * | 1/2009 | Sugeta | 358/475 |
| 2005/0094215 A1 | * | 5/2005 | Nagasaka | 358/406 |
| 2005/0213167 A1 | * | 9/2005 | Shiraishi | 358/474 |

FOREIGN PATENT DOCUMENTS

| | | |
|---|---|---|
| JP | 2002-247296 A | 8/2002 |
| JP | 2005-51381 A | 2/2005 |

* cited by examiner

*Primary Examiner* — Charlotte M Baker
*Assistant Examiner* — Rury Grisham
(74) *Attorney, Agent, or Firm* — Rossi, Kimms & McDowell LLP

(57) ABSTRACT

An original reader which is capable of continuously performing a reading operation for reading images from originals without causing degradation of the quality of the read images, even when a light emitter of an illumination unit or a driving circuit for the light emitter fails. An original illuminating lamp including two LED circuit boards each having eight LED blocks linearly arranged in the main scanning direction of an original illuminates the original. An image sensor reads an image from the original illuminated by the original illuminating lamp. When it is detected that at least one of the LED blocks does not emit light, a CPU performs control such that the light amount of an LED block opposed to the LED block emitting no light is increased to be larger than when it is not detected that at least one of the LED blocks does not emit light.

6 Claims, 8 Drawing Sheets

ORIGINAL READER

BACKGROUND OF THE INVENTION

1. Field of the Invention

The present invention relates to an original reader having an illumination unit comprised of a plurality of light emitter arrays each formed by a plurality of light emitters arranged in a row.

2. Description of the Related Art

Conventionally, an illuminating light source used in an original reader has often been implemented by an Xe fluorescent tube filled with Xe (xenon) gas or the like.

However, a fluorescent tube, such as an Xe tube, which is driven for emission of light by high-frequency alternating current, needs an inverter for converting a DC voltage into an AC voltage, and hence it is required to secure space for disposing the inverter in the original reader. Further, since a fluorescent tube such as an Xe tube has a low light-emitting efficiency, a large amount of heat is generated from the inverter and the fluorescent tube. Therefore, countermeasures against the heat generation and corresponding electric power are required. In addition, the service life of a fluorescent tube, such as an Xe tube, is relatively short due to light amount deterioration caused by aging.

On the other hand, an LED (light emitting diode) which is capable of emitting an appropriate amount of light has been developed so as to solve the problems from which an Xe tube or the like fluorescent tube suffers, and there has been proposed an original reader provided with an illuminating light source formed by arranging a plurality of LEDs (see Japanese Paten Laid-Open Publications (Kokai) No. 2002-247296 and No. 2005-051381).

In the original reader, as shown in FIG. 7, e.g. 48 white LEDs 201 are linearly arranged on an LED circuit board 200 in the main scanning direction of an original to form the illuminating light source.

In this case, the 48 LEDs 201 connected in series are divided into six blocks 301, as shown in FIG. 8, and each of the blocks 301 is connected to a driving circuit 302. The driving circuit 302 is a constant current circuit. Assuming that a forward voltage per one LED 201 is 3.3 V, the driving circuit 302 applies a voltage higher than 3.3 V×6=19.8 V to thereby feed a desired electric current to each block 301.

In principle, the 48 LEDs 201 may be all connected in series to form a constant current circuit. However, this circuit requires more than 158.4 V (=3.3 V×48) as a voltage to be supplied, and hence is not practical. For this reason, there is used such a simple constant current circuit as shown in FIG. 8. In this case, the amount of light emitted from the LEDs 201 can slightly differ from block to block, but this does not matter because the differences can be sufficiently corrected by shading correction, referred to hereinafter.

In the illustrated example, it is assumed that the driving circuit 302 applies a voltage of 24 V to the block 301 to thereby feed a standard constant current of 20 mA. Since the driving circuit 302 is a constant current circuit, a stable current of 20 mA flows, which stabilizes the light amount of each LED 201, so that the LEDs 201 functions as an excellent illuminating light source of the original reader.

In the above-described prior art, however, the 48 LEDs 201 connected in series are divided into six blocks 301. For this reason, if one LED 201 is disconnected or faulty or if one driving circuit 302 fails, all including normal LEDs 201 in the block 301 cannot be turned on.

As a consequence, the original reader is incapable of performing an image reading operation until a part of the driving circuit 302 or the LED 201 in trouble is replaced.

SUMMARY OF THE INVENTION

The present invention provides an original reader which is capable of continuously performing a reading operation for reading images from originals without causing degradation of the quality of the read images, even when a light emitter of an illumination unit or a driving circuit for the light emitter fails.

In a first aspect of the present invention, there is provided an original reader comprising an illumination unit including a plurality of light emitter arrays each having a plurality of light emitters arranged in a row in a main scanning direction of an original, the illumination unit being adapted to illuminate the original, a reading unit adapted to read an image from the original illuminated by the illumination unit, a detecting unit adapted to detect that at least one light emitter of the illumination unit does not emit light, and a control unit adapted to perform control, in response to detection by the detecting unit that at least one light emitter of the illumination unit does not emit light, such that an amount of light emitted from a light emitter opposed to the light emitter that does not emit light is increased to be larger than an amount of light emitted by the light emitter when the detecting unit does not detect that the at least one light emitter of the illumination unit does not emit light.

In a second aspect of the present invention, there is provided an original reader comprising an illumination unit including a plurality of light emitter arrays each having a plurality of light emitters arranged in a row, the illumination unit being adapted to illuminate the original to be read, a detecting unit adapted to detect that at least one light emitter of the illumination unit does not emit light, and a control unit adapted to perform control, in response to detection by the detecting unit that at least one light emitter of the illumination unit does not emit light, such that an amount of light emitted from a light emitter opposed to the light emitter that does not emit light is increased.

In a third aspect of the present invention, there is provided an original reader comprising an illumination unit including a plurality of light emitter arrays each having a plurality of light emitters arranged in a row, the illumination unit being adapted to illuminate the original to be read, a detecting unit adapted to detect an amount of light of each light emitter, and a control unit adapted to perform control, in response to detection by the detecting unit that an amount of light of at least one light emitter is lower than a predetermined amount, such that an amount of light emitted from a light emitter opposed to the light emitter of which the amount of light is lower than the predetermined amount is increased.

According to the present invention, it is possible to continuously carry out an image reading operation without causing degradation of the quality of a read image, even when a light emitter of an illumination unit or a driving circuit for the light emitter fails.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing an embodiment thereof.

Figure 1:
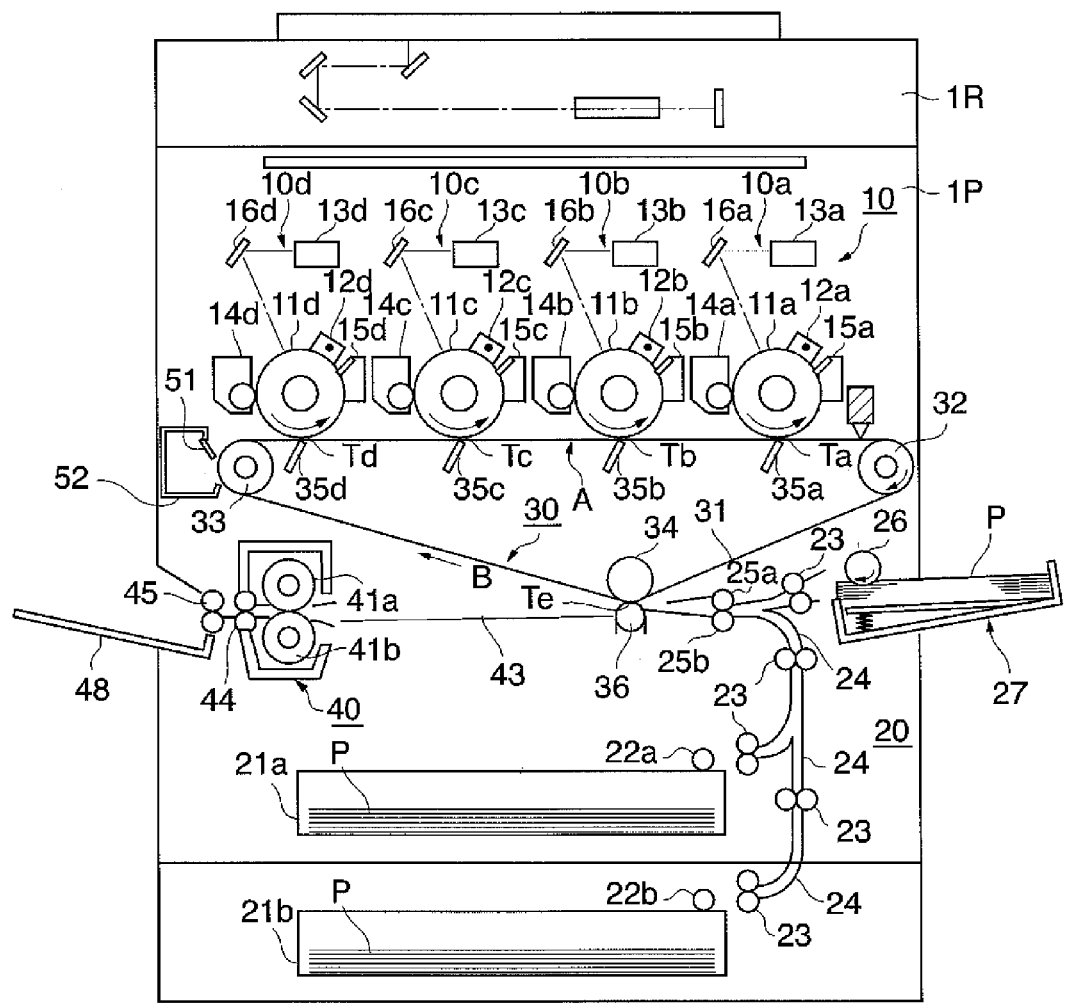
FIG. 1 is a cross-sectional view of an image forming apparatus including an original reader according to an embodiment of the present invention.

FIG. 1 is a cross-sectional view of an image forming apparatus including an original reader according to the embodiment of the present invention.

The image forming apparatus reads an image from an original using the original reader 1R and forms an image on a sheet P based on image data from the original reader 1R, by electrophotography using a printer 1P.

First, a description will be given of the printer 1P. Roughly, the printer 1P is comprised of an image forming section 10 having four image stations 10a to 10d, a sheet feed unit 20, an intermediate transfer unit 30, and a fixing unit 40.

In the image forming section 10, there are arranged photosensitive drums 11a to 11d as image bearing members. Primary electrostatic chargers 12a to 12d, exposure units 13a to 13d, reflecting mirrors 16a to 16d, and developing devices 14a to 14d are disposed in facing relation to the outer peripheral surfaces of the associated ones of the photosensitive drums 11a to 11d.

The primary electrostatic chargers 12a to 12d causes the surfaces of the respective photosensitive drums 11a to 11d to be charged with a uniform amount of electric charge. The exposure units 13a to 13d apply light beams, such as laser beams, having a wavelength thereof modulated in accordance with image data to the respective photosensitive drums 11a to 11d via the respective reflecting mirrors 16a to 16d, whereby an electrostatic latent image is formed on each of the photosensitive drums 11a to 11d.

The developing devices 14a to 14d visualize the electrostatic latent images formed on the respective photosensitive drums 11a to 11d, using respective toners of four colors, i.e. yellow, cyan, magenta, and black, which are contained in the respective developing devices 14a to 14d. The visible images (developed images) are sequentially transferred onto an intermediate transfer belt 31 as an intermediate transfer member via respective primary transfer areas Td, Tc, Tb, and Ta.

Toners left on the respective photosensitive drums 11a to 11d without being transferred onto the intermediate transfer belt 31 are scraped off by respective associated cleaning devices 15a to 15d, whereby the surfaces of the respective photosensitive drums 11a to 11d are cleaned.

The sheet feed unit 20 includes cassettes 21a and 21b for containing sheets P, a manual feed tray 27, and pickup rollers 22a, 22b, and 26 for feeding sheets P one by one from the cassettes 21a and 21b and the manual feed tray 27, respectively.

Further, the sheet feed unit 20 is provided with feed roller pairs 23 and feed guides 24 for conveying the sheets P fed by the pickup rollers 22a, 22b, and 26 to registration rollers 25a and 25b.

The sheet feed unit 20 also includes the registration rollers 25a and 25b for conveying sheets P to a secondary transfer area Te in timing synchronous with image formation in the image forming section 10.

The intermediate transfer unit 30 has the intermediate transfer belt 31 wound around a drive roller 32, a driven roller 33, and a secondary transfer counter roller 34 opposed to the secondary transfer area Te via the intermediate transfer belt 31. A primary transfer plane A is formed between the drive roller 32 and the driven roller 33 of the intermediate belt 31.

The drive roller 32 is formed by coating a metal roller with a rubber (urethane rubber or chloroprene rubber) layer or the like having a thickness of several millimeters, so as to prevent slippage between the intermediate transfer belt 31 and the drive roller 32 itself. The drive roller 32 is driven by a pulse motor, not shown, to cause rotation of the intermediate transfer belt 31 in a direction indicated by an arrow B in FIG. 1.

The photosensitive drums 11a to 11d face the primary transfer plane A. Therefore, the primary image transfer areas Ta to Td are arranged on the primary transfer plane A. At respective locations opposite to the primary image transfer areas Ta to Td with respect to the intermediate transfer belt 31, there are disposed primary-transfer electrostatic chargers 35a to 35d in a manner opposed to the respective photosensitive drums 11a to 11d with the intermediate transfer belt 31 therebetween.

At a location opposed to the secondary transfer counter roller 34, there is disposed a secondary transfer roller 36 which forms the secondary transfer area Te on the intermediate transfer belt 31 by a nip between with the secondary transfer counter roller 34 and the secondary transfer roller 36 itself. The secondary transfer roller 36 is pressed against the intermediate transfer belt 31 under appropriate pressure.

Further, at a location downstream of the secondary transfer area Te on the intermediate transfer belt 31, there are provided a cleaning blade 51 for cleaning the image forming surface of the intermediate transfer belt 31, and a waste toner box 52 for receiving waste toner scraped off by the cleaning blade 51.

The fixing unit 40 includes a fixing roller 41a containing a heat source, such as a halogen heater, a pressure roller 41b paired with the fixing roller 41a, and a guide 43 for guiding a sheet P into a nip between the roller pair 41a and 41b. It should be noted that the pressure roller 41b as well may be provided with a heat source. Further, the fixing unit 40 includes sheet discharge roller pairs 44 and 45 for further guiding out a sheet P discharged from the roller pair 41a and 41b, from the apparatus.

Next, a description will be given of an example of the operation of the printer 1P constructed as above.

When an image forming operation start signal is transmitted from a controller unit, not shown, first, sheets P are fed one by one from a selected one of the cassettes, e.g. the cassette 21a by the associated pickup roller 22a. Then, each sheet P is conveyed to the registration rollers 25a and 25b while being guided along the feed guides 24 by the feed roller pairs 23. At this time, the leading end of the sheet P abuts against a nip portion of the registration rollers 25a and 25b at rest.

Thereafter, the registration rollers 25a and 25b start rotation in timing synchronous with start of image formation by the image forming section 10. Specifically, the registration rollers 25a and 25b start rotation such that the sheet P and a toner image primarily transferred onto the intermediate transfer belt 31 meet each other in the secondary transfer area Te.

On the other hand, in the image forming section 10, when the image forming operation start signal is transmitted from the control section, a toner image formed on the photosensitive drum 11d is primarily transferred onto the intermediate transfer belt 31 in the primary transfer area Td by the primary-transfer electrostatic charger 35d.

The primarily transferred toner image is conveyed to the next primary transfer area Tc. In the primary transfer area Tc, a toner image is transferred onto the image from the immediately upstream primary transfer area Td, in aligned registration (in an aligned position) with the image formed at the upstream primary transfer area Td. Further, a similar operation is carried out in each of the primary transfer areas Tb and Ta for the other colors, and after all, the toner images in the respective four colors are primarily transferred onto the intermediate transfer belt 31.

Thereafter, when the sheet P enters the secondary transfer area Te and comes into contact with the intermediate transfer belt 31, a high voltage is applied to the secondary transfer roller 36 in timing synchronous with passage of the sheet P. Then, the toner images in the respective four colors are collectively transferred onto the surface of the sheet P.

Thereafter, the sheet P is guided by the transfer guide 43 to a nip between the fixing roller pair 41, and the toner image is fixed on the surface of the sheet P by the heat of the fixing roller pair 41 and the nip pressure at the nip. Then, the sheet P is conveyed by the discharge roller pairs 44 and 45 to be discharged into a discharge tray 48.

Next, the original reader according to the present embodiment will be described with reference to FIGS. 2A and 2B.

Figure 2A:
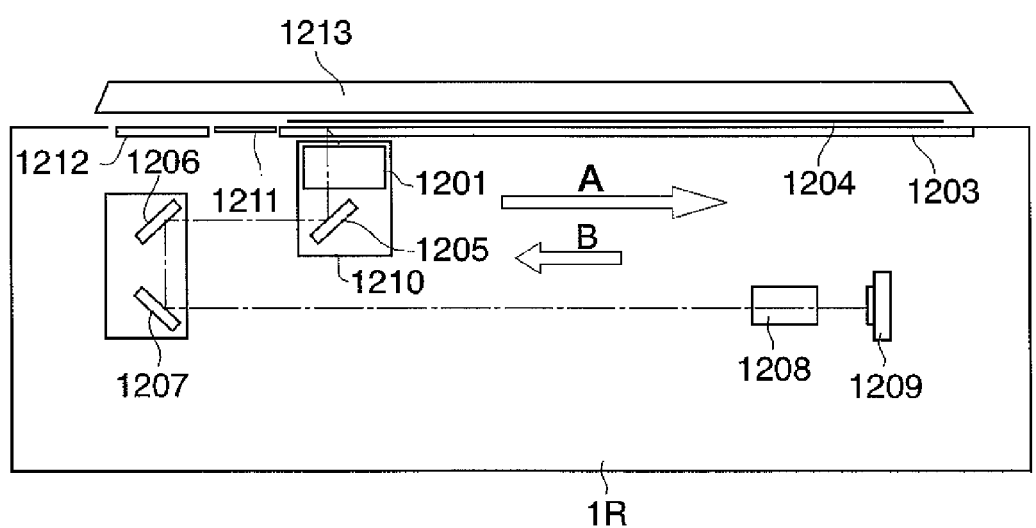
FIG. 2A is a cross-sectional view of essential parts of the image forming apparatus, which is useful in explaining the original reader according to the embodiment.
Figure 2B:
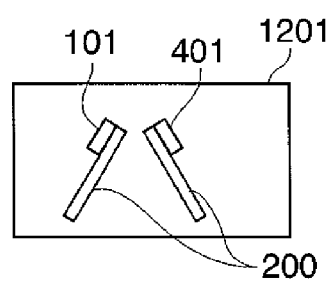
FIG. 2B is a partial enlarged view of FIG. 2A.

As shown in FIGS. 2A and 2B, in the original reader 1R according to the present embodiment, an original 1204 placed on an original platen glass 1203 is illuminated by an original illuminating lamp (illumination unit) 1201. An image of the original 1204 illuminated by the original illuminating lamp 1201 is formed on an image sensor (reading unit) 1209 via a first mirror 1205, a second mirror 1206, a third mirror 1207, and a lens 1208, whereby line images of the original 1204 are read.

A reader section 1210 comprised of the original illuminating lamp 1201 and the first mirror 1205 sequentially reads the line images of the original 1204 while moving in a direction indicated by an arrow A appearing in FIG. 2A. At the same time, the second mirror 1206 and the third mirror 1207 are also moved in the direction indicated by the arrow A, by a drive system, not shown, such that the distance (optical path length) between a surface of the original 1204 and the image sensor 1209 is held constant.

Next, a description will be given of the basic image reading operation of the original reader 1R.

When an operator inputs an original reading command (e.g. by depressing a copy button), the original reader 1R causes the reader section 1210, by a drive system, not shown, to move from a position in FIG. 2A (which is set as a home position), in a direction indicated by an arrow B in FIG. 2A, to a position immediately below a shading correction plate 1211.

Then, the original reader 1R turns on the original illuminating lamp 1201 to illuminate the shading correction plate 1211, thereby guiding a line image from the shading correction plate 1211 to the image sensor 1209 via the first mirror 1205, the second mirror 1206, the third mirror 1207, and the lens 1208.

The image sensor 1209 reads the line image from the shading correction plate 1211, and pixel-by-pixel output signals of the read line image are corrected by an image processing circuit, not shown, such that the output levels of all the pixels become equal to a predetermined level. This shading correction process corrects uneven illuminance of the original illuminating lamp 1201, reduced light amount on the periphery of the lens 1208, and pixel-by-pixel variations in sensitivity of the image sensor 1209, whereby uneven image reading of the original is corrected.

When the shading correction process is completed, the reader section 1210 is driven by the drive system, not shown, to further move in the direction indicated by the arrow B in FIG. 2A to a position immediately below a member 1212. The position immediately below the member 1212 is the home position of the reader section 1210. The drive system, not shown, is controlled to move the reader section 1210 from the home position in the direction indicated by the arrow A in FIG. 2A while accelerating the same so that the reader section 1210 is moved at a predetermined constant speed before reaching a position just below the leading end of the original 1204 on the original platen glass 1203. When the reader section 1210 reaches the position just below the leading end of the original 1204, the image sensor 1209 starts an operation for reading the image on the original 1204.

The drive system, not shown, moves the reader section 1210 at the constant speed in the direction indicated by the arrow A in FIG. 2A. Then, after reading of the original 1204 up to the trailing end thereof has been completed, the drive system stops driving the reader section 1210, and moves the same in the direction indicated by the arrow B in FIG. 2A to the home position shown in FIG. 2A, followed by terminating the sequence of image reading processing and entering a standby state for next reading processing.

In the present embodiment, the original illuminating lamp 1201 is comprised of two LED circuit boards 200 each having e.g. 48 white LEDs (light emitting diodes) 201 linearly arranged thereon in the main scanning direction of the original 1204. The two LED circuit boards 200 are disposed in facing relation. More specifically, the two LED circuit boards (two light emitter arrays) are disposed in parallel in the main scanning direction. Although in the present embodiment, the original illuminating lamp 1201 has two light emitter arrays, the present invention is also applicable to a case where an original illuminating lamp has three or more light emitter arrays.

Further, one of the two LED circuit boards 200 has a first LED block group (light emitter array) 101 disposed thereon, while the other LED circuit board 200 has a second LED block group (light emitter array) 401 disposed thereon.

Figure 3:
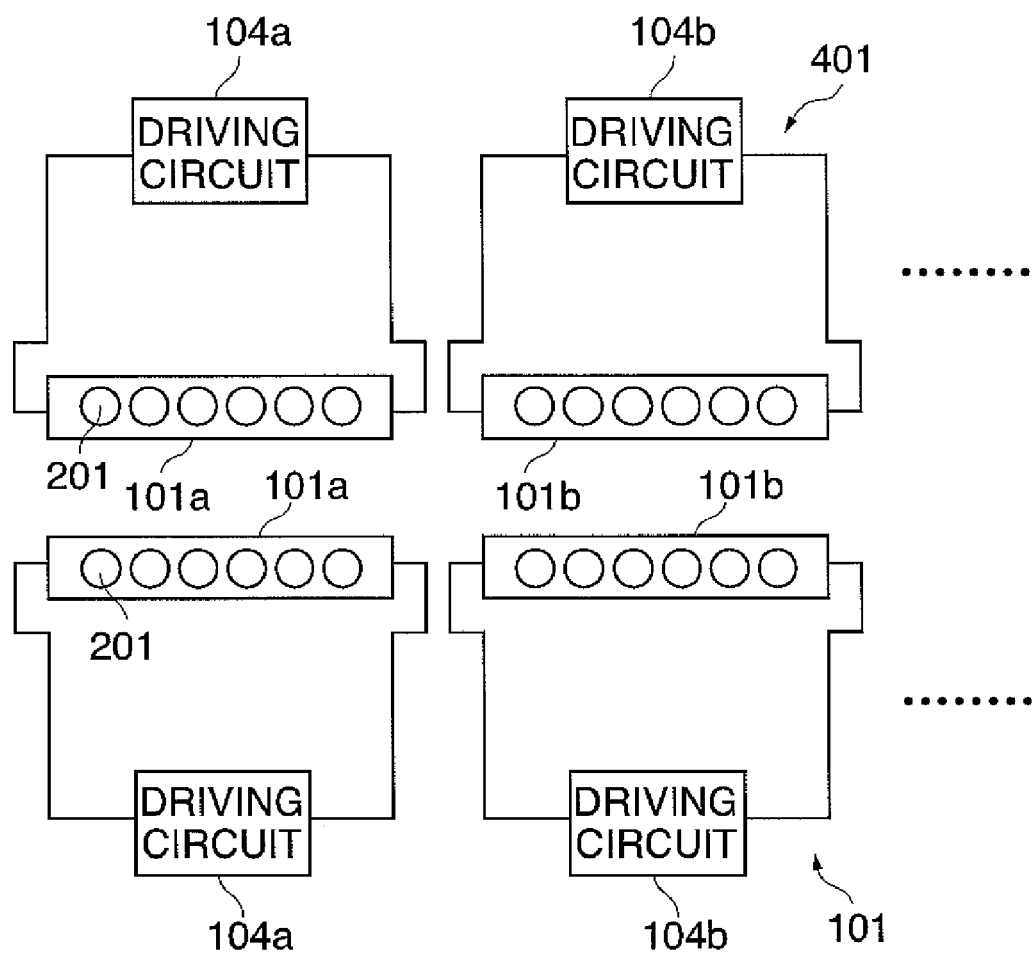
FIG. 3 is a diagram useful in explaining a first LED block group and a second LED block group.

As shown in FIG. 3, each of the first LED block group 101 and the second LED block group 401 has eight blocks 101 (blocks 101a, 101b, . . . . Each of the blocks 101a, 101b, is comprised of linearly arranged six LEDs (light emitters) 201. Further, the blocks 101a, 101b . . . are connected to driving circuits 104a, 104b, . . . , respectively, for turning on the LEDs 201. It should be noted that a surface light emitting device, such as an organic EL device, having the same size as the first LED block group 101 or the second LED block group 401 may be used in place of the block comprised of the LEDs.

The driving circuits 104a, 104b, . . . are each a constant current circuit which when a forward voltage per one LED 201 is set to 3.3 V, applies a voltage of 19.8 V or more (3.3 V×6=19.8) to feed a desired electric current to the associated one of the block 101a, 101b . . . .

It should be noted that the driving circuits 104a, 104b, . . . are each capable of applying an electric current of 40 mA at the maximum, and normally drives the associated block of the LEDs 201 with a constant current of 20 mA. Further, the driving circuits 104a, 104b, . . . each also have a current control function for fine adjustment of the light amount of the LEDs 201 of the associated one of the block 101a, 101b. . . .

Figure 4:
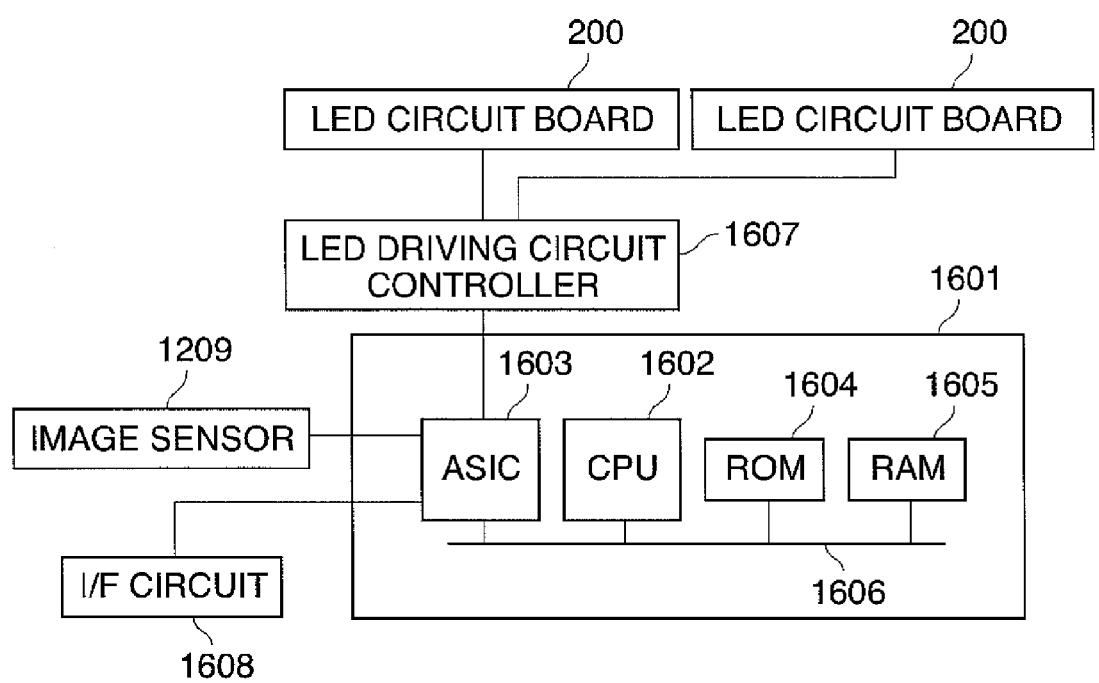
FIG. 4 is a block diagram useful in explaining an example of a control circuit of the original reader according to the embodiment.

FIG. 4 is a block diagram of an example of a control circuit of the original reader 1R according to the present embodiment.

As shown in FIG. 4, the original reader 1R according to the present embodiment is comprised of a control circuit board 1601, an LED driving circuit controller 1607, and an interface circuit 1608.

The control circuit board 1601 is comprised of a CPU 1602 for controlling the overall operation of the original reader 1R, an ASIC (Application-Specific Integrated Circuit) 1603, a ROM 1604, and a RAM 1605, and these devices are interconnected via a system bus 1606.

The ROM 1604 stores control programs to be executed by the CPU 1602, and the RAM 1605 is used as a work area by the CPU 1602.

The ASIC 1603 is a large-scale integrated circuit that transmits and receives control signals for image processing including the shading correction and operations of the main units of the original reader in response to respective commands from the CPU 1602.

The ASIC 1603 is connected to the image sensor 1209, and receives line images of an image of an original (hereinafter referred to as an "original image") output from the same. Further, the ASIC 1603 is connected to the interface circuit 1608. The ASIC 1603 carries out image processing on the original image read by the image sensor 1209 and outputs image signals to an external apparatus, such as a printer IP, connected to the interface circuit 1608. Furthermore, the ASIC 1603 is connected to the LED driving circuit controller 1607.

The LED driving circuit controller 1607 incorporates the driving circuits 104a, 104b, . . . . The driving circuits 104a, 104b, . . . are controlled by the CPU 1602 via the ASIC 1603.

In the present embodiment, the two LED circuit boards 200 are connected to the LED driving circuit controller 1607, and each of the LED circuit boards 200 incorporates eight circuits each having the six LEDs 201 as one block as described hereinbefore. This means that the LED driving circuit controller 1607 incorporates 16 LED driving circuits in total.

Figure 5A:
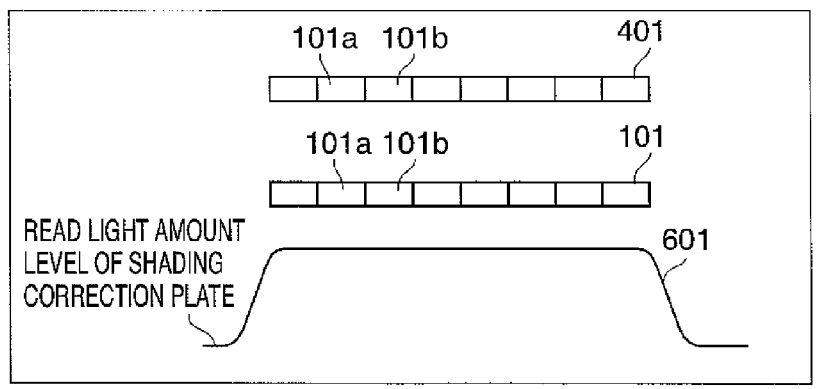
FIGS. 5A to 5D are diagrams useful in explaining the correspondence between the LED block groups and a read light amount level of a shading correction plate.

FIG. 5A shows a read light amount level indicative of an amount of light on the shading correction plate 1211 read in the above-described shading correction process, in association with the first LED block group 101 and the second LED block group 401.

The read light amount level 601, shown in FIG. 5A, at which the shading correction plate 1211 is read is uniform within a range illuminated by the first LED block group 101 and the second LED block group 401.

Figure 5B:
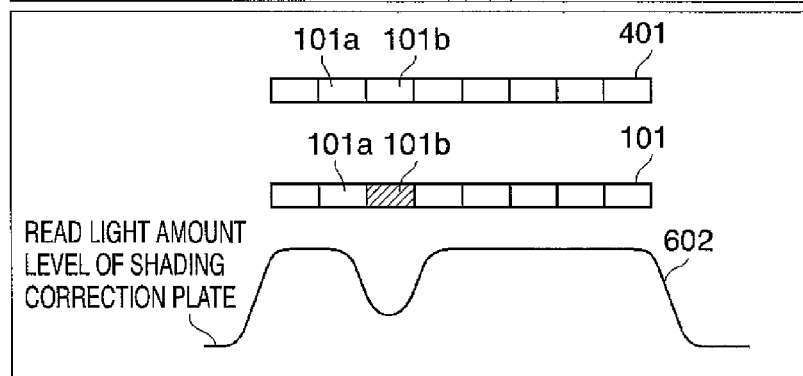

Now, let it be assumed that the driving circuit 104b of the first LED block group 101, appearing in FIG. 3, has failed for some reason. In this case, none of the six LEDs 201 of an LED block 101b connected to the driving circuit 104b of the first LED block group 101 are turned on, and hence the read light amount level 602 at which the shading correction plate 1211 is read changes as shown in FIG. 5B. This sharp reduction of the light amount in a portion in the main scanning direction makes it impossible for the original reader 1R to execute normal image reading processing.

A method of coping with such a failure state will be described with reference to FIGS. 5A to 5D and 6.

FIGS. 5A to 5D are diagrams useful in explaining the correspondence between the LED block groups and the read light amount level of the shading correction plate. FIG. 6 is a flowchart of the shading correction process including a light amount correction process to be executed when a driving circuit fails. It should be noted that the shading correction process in FIG. 6 is executed by the CPU (control unit) 1602 by loading into the RAM 1605 a control program stored e.g. in the ROM 1604 of the control circuit board 1601.

First, the CPU 1602 executes the shading correction process, as described hereinbefore, in response to an image reading instruction from a user.

More specifically, the CPU 1602 moves the reader section 1210 to the reading position of the shading correction plate 1211, and then controls the LED driving circuit controller 1607 to cause the first and second LED block groups 101 and 401 to emit light, by driving the LED block groups 101 and 401 with the constant current of 20 mA. Then, the CPU 1602 outputs image data of an original detected by the image sensor 1209 to the ASIC 1603 (step S801). Next, the CPU 1602 stores the output data as line-by-line profile data in the ASIC 1603 (step S802).

Then, the CPU 1602 refers to the line-by-line profile data and compares a read light amount level based on the profile data with a reference value a. The reference value a is set to a value determined assuming a case where an apparent light amount drop is caused by defective light emission e.g. due to failure of a LED block group 101 or 401 (step S803).

For example, if the driving circuit 104b of the first LED block group 101 fails (read light amount level<reference value a), the correspondence between the read light amount level 602 at which the shading correction plate 1211 is read and the two LED block groups 101 and 401 becomes as shown in FIG. 5B.

In this case, the read state of the shading correction plate 1211 originally having a uniform white density is represented by a profile appearing in FIG. 5B, and hence the CPU 1602 determines that a block corresponding to a portion of the profile representing a read light amount level lowered below the reference value a, as a defective block which does not emit light. In the example shown in FIG. 5B, it is detected that light is not emitted from one of the respective blocks 101b of the LED block groups 101 and 140 (step S804).

At this time, the CPU 1602 causes the driving circuits 104b of the respective LED block groups 101 and 401 in the LED driving circuit controller 1607, via the ASIC 1603, to change the drive current from 20 mA to 40 mA (step S805).

In the step S805, control is performed so as to cause the current of 40 mA to flow through both the driving circuits 104b, without determining which of the LED block groups 101 and 401 includes the defective block 101b which does not emit light. However, since one of the two blocks 101b, i.e. the block 101b of the LED block group 101 in the case of the illustrated example, does not emit light, only the other block 101b, i.e. only the block 101b of the LED block group 401 has its light amount doubled by the drive current change control by the CPU 1602.

It should be noted that if the CPU 1602 performs control for causing the LED block groups 101 and 401 to emit light in different timing, it is possible to determine which of the two blocks 101b of the LED blocks 101 and 401 does not emit light. In this case, it is possible to obtain the same advantageous actions and effects as described above by causing the CPU 1602 to perform control such that the current of 40 mA is supplied to the driving circuit 104b of the block 101b which emits light.

Figure 5C:
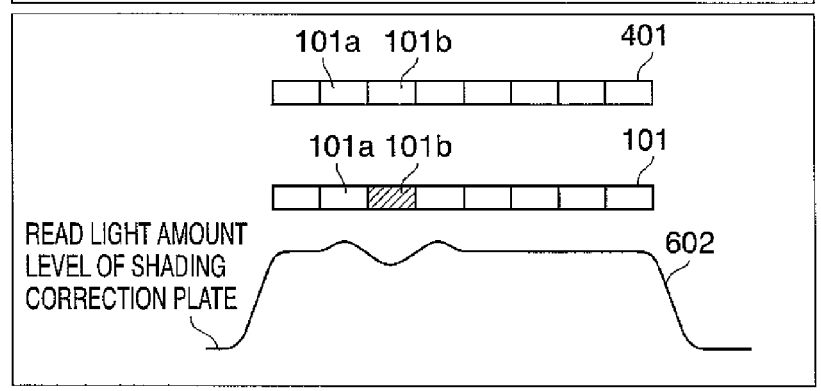
Figure 6A:
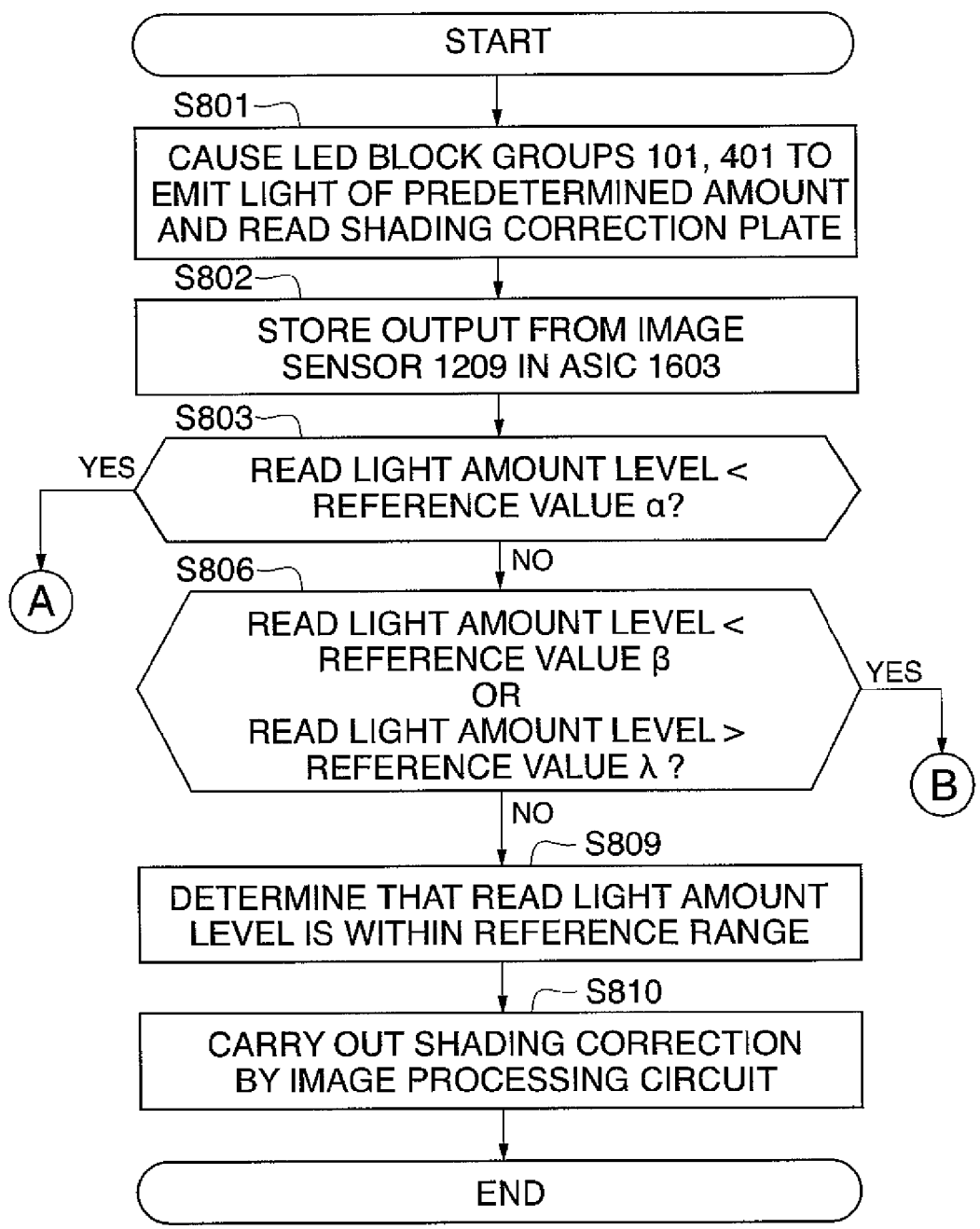
FIG. 6 is a flowchart of a shading correction process including a light amount correction process to be executed when a driving circuit fails.
Figure 6B:
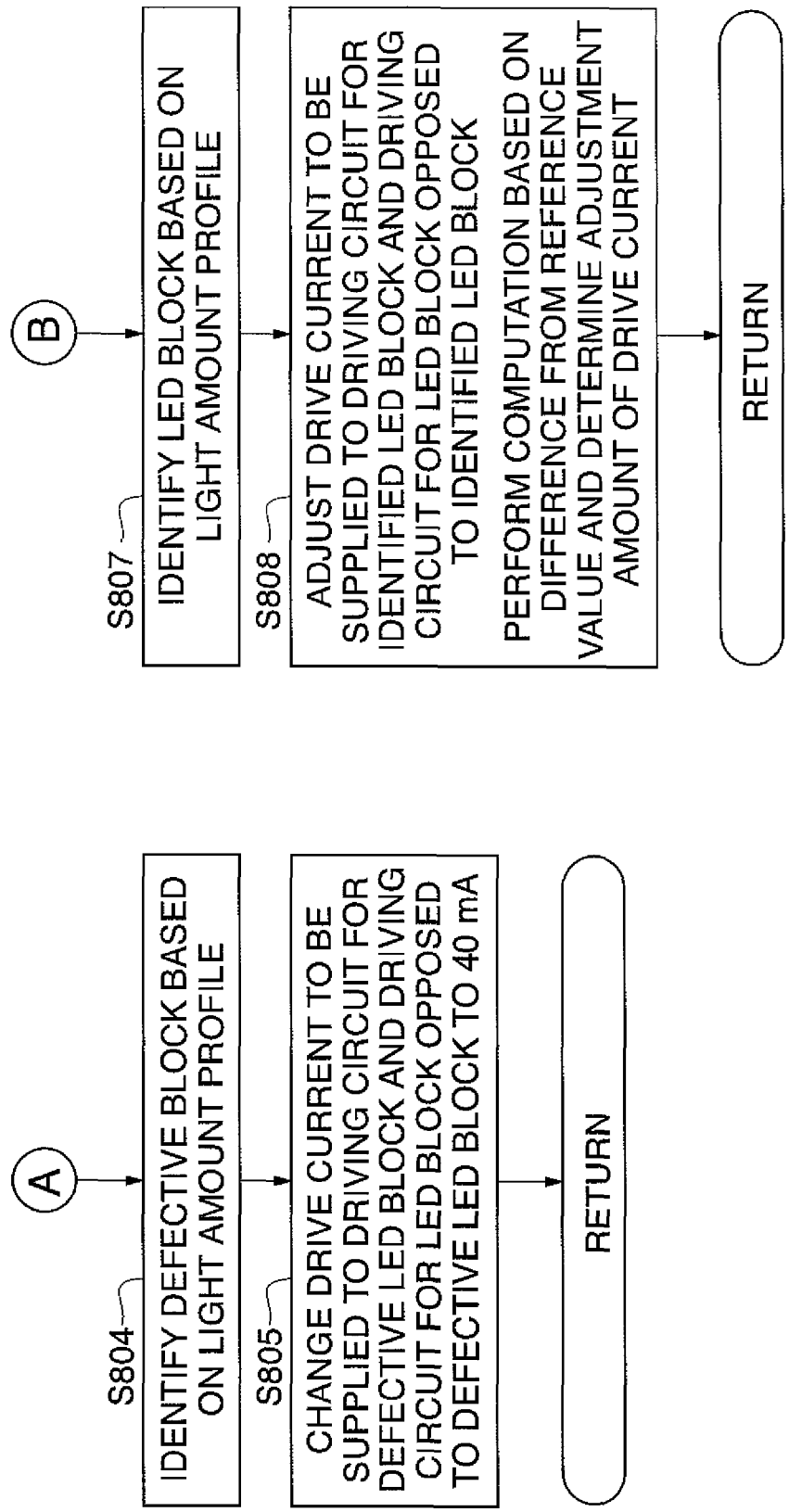
Figure 7:
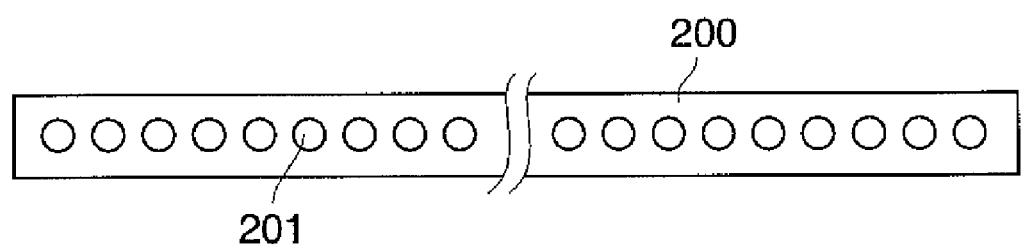
FIG. 7 is a view of a conventional LED circuit board.
Figure 8:
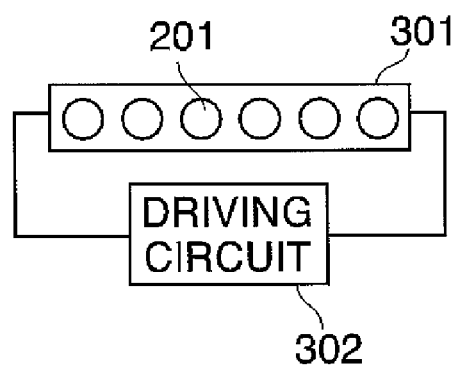
FIG. 8 is a diagram of an example of an LED block of the conventional LED circuit board.

As a consequence, in the aforementioned shading correction carried out again by the original reader 1R, the read light amount level 602 at which the shading correction plate 1211 is read changes as shown in FIG. 5C.

In FIG. 5C, the light amount of the block 101b of the second LED block group 401 opposed to that of the first LED block group 101 having its light amount reduced due to failure of the driving circuit 104b of the same has been increased. As a consequence, the total amount of light from the two LED block groups 101 and 401 becomes approximately equal to the normal light amount.

In this case, however, the light amount of a normal block in the vicinity of the block 101b to which the current of 40 mA is supplied can be increased. In such a case, the CPU 1602 identifies a block whose light amount has been changed, and finely adjusts the light amount of the block. The CPU 1602 determines, by referring to the profile data, whether or not a block whose light amount is not within a predetermined reference range is present, i.e. whether or not a block is present in which a reference value $\beta$>the light amount or the light amount>a reference value $\lambda$ holds (step S806). If such a block is present (YES to the step S806), the CPU 1602 identifies the LED block based on the profile of the light amount (step S807).

Then, the CPU 1602 performs control such that a drive current to be supplied to the identified LED block is finely adjusted, to thereby cause the light amount irregularity to be within a predetermined reference range (step S808). Specifically, the CPU 1602 controls the drive current supplied to the driving circuit of the identified LED block and that of an LED block opposed to the identified LED block, so as to perform adjustment such that the light amount irregularity falls within the predetermined reference range. The amount of adjustment of the drive current is determined based on the difference from the reference value $\beta$ or $\lambda$ of the light amount. It should be noted that the reference values $\beta$ and $\lambda$ are set to respective values determined assuming a case where the light amount varies due to deposition of fine dust or the like on the shading correction plate 1211.

Figure 5D:
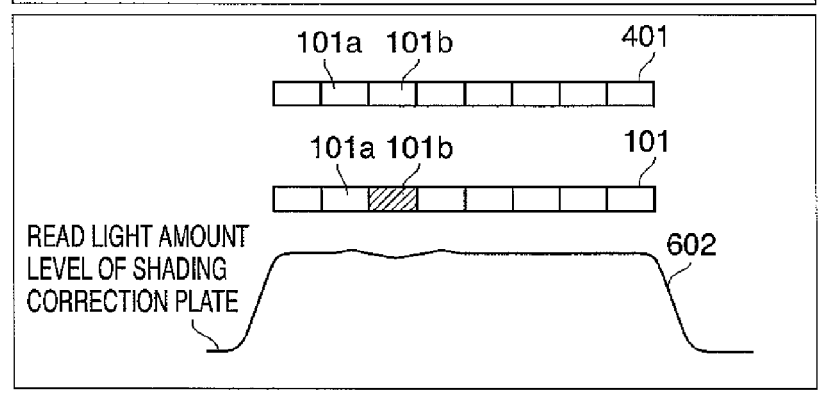

Further, the CPU 1602 controls each driving circuit to finely adjust the drive current according to the amount of light emitted from the associated LED block. However, a slight light amount irregularity can occur in a portion illuminated by the blocks 101b of the respective LED block groups 101 and 401. This light amount irregularity is corrected by the shading correction process (steps S809 and S810), whereby the read light amount level at which the shading correction plate 1211 is read becomes as shown in FIG. 5D. From FIG. 5D, it can be said that there is a possibility of slight degradation of image quality from the image quality obtained by normal operation, but this can hardly cause a difference in image quality of an image read from a high-contrast original including an original of ordinary text or an illustration.

It should be noted that while an image reading operation can be continued, the original reader unit 1R is actually in failure. Therefore, by configuring the CPU 1602 such that it notifies the user of the failure of the original reader unit 1R via the original reader unit 1R itself, the printer 1P, or an external device, the user can promptly cope with the failure.

Further, in the present embodiment, while the drive current of 20 mA is sufficient when the driving circuits 104b are in normal operation, the original reader unit 1R is configured in view of occurrence of failure such that it is capable of supplying a drive current of 40 mA to each of the driving circuits 104b. This may seem like overspecification for a constant current circuit, but it is a constant-current circuit operating at a current of only 40 mA or so at highest, which causes little difference in the circuit scale or manufacturing costs from a driving circuit operating at a current of 20 mA. Further, as a matter of course, total power consumption by a light source at a normal time is equal to that at a failure time, and therefore the designing of a power supply for the constant current circuits is hardly affected.

Furthermore, when the light amount profile is not improved even after execution of the light amount correction, the CPU 1602 determines that the image sensor has failed, i.e. that an error has occurred. In this case, it is desirable that the CPU 1602 notifies the user by display or indication, or voices, of the failure of the image sensor via the original reader unit 1R, the printer 1P, or an external device, for the user to promptly cope with the failure.

As described heretofore, according to the present embodiment, even when an LED block or a driving circuit fails, it is possible to correct the light amounts of respective LED blocks in the vicinity of the defective LED block to thereby continue the image reading operation without causing degradation of the quality of a read image.

Further, the defective LED block can be automatically determined, and the control operation for correcting the light amounts of respective LED blocks in the vicinity of the defective LED block is carried out based on a result of the determination. Therefore, it is possible to carry out necessary counter-measure operations without troubling the user and prevent the user from carrying out an erroneous determination or operation.

It should be noted that the present invention is not limited to the above-described embodiment, but it can be practiced in various forms, without departing from the spirit and scope thereof.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2007-293244 filed Nov. 12, 2007, which is hereby incorporated by reference herein in its entirety.

What is claimed is:

1. An original reader comprising:
an illumination unit including two light emitter arrays, each having a plurality of light emitters, the two light emitter arrays being disposed in parallel with each other, and said illumination unit being adapted to illuminate the original;
a reading unit adapted to read the original illuminated by said illumination unit and output image data;
a detecting unit adapted to detect a defective light emitter in said illumination unit, from the plurality of light emitters in the two light emitter arrays; and
a control unit adapted to increase, when the defective light emitter is detected in one of the two light emitter arrays by the detecting unit, an amount of light of a light emitter, in the other of the two light emitter arrays, which is disposed at a position corresponding to a position of the defective light emitter in the one of the two light emitter arrays.

2. The original reader according to claim 1, wherein each of the plurality light emitters are a plurality of light emitting diodes.

3. The original reader according to claim 1, wherein said reading unit is further adapted to read a shading correction plate, and said detecting unit detects the defective light emitter of said illumination unit based on an image data of the shading correction plate read by said reading unit.

4. The original reader according to claim 1, wherein the two light emitter arrays are disposed in opposed relation.

5. The original reader according to claim 3, wherein said detecting unit detects an image data of which the amount of light is lower than a predetermined amount.

6. The original reader according to claim 1, further comprising a second detecting unit adapted to detect a light emitter of which an amount of light is out of a predetermined range, wherein the control unit adjusts the amount of the detected light emitter.

\* \* \* \* \*